(12) United States Patent
Yoshiyama

(10) Patent No.: US 7,531,052 B2
(45) Date of Patent: May 12, 2009

(54) STEEL STRIP FOR RAZOR BLADES AND METHOD OF MANUFACTURING THE SAME

(75) Inventor: Goh Yoshiyama, Yasugi (JP)

(73) Assignee: Hitachi Metals, Ltd., Tokyo (JP)

( * ) Notice: Subject to any disclaimer, the term of this patent is extended or adjusted under 35 U.S.C. 154(b) by 332 days.

(21) Appl. No.: 11/058,430

(22) Filed: Feb. 16, 2005

(65) Prior Publication Data

US 2006/0000526 A1    Jan. 5, 2006

(30) Foreign Application Priority Data

Apr. 27, 2004    (JP)    ............... 2004-130829

(51) Int. Cl.
*C22C 38/18*    (2006.01)
(52) U.S. Cl. .................................... 148/325
(58) Field of Classification Search ................. 148/325
See application file for complete search history.

(56) References Cited

U.S. PATENT DOCUMENTS

| | | | |
|---|---|---|---|
| 3,425,877 A | | 2/1969 | Deacon et al. |
| 4,074,431 A | * | 2/1978 | Beaver et al. ............... 30/353 |
| 5,359,872 A | | 11/1994 | Nashiki et al. |
| 6,273,973 B1 | * | 8/2001 | Parayil et al. ............... 148/542 |
| 6,629,475 B1 | | 10/2003 | Neamtu et al. |

2003/0116543 A1    6/2003 Battaglia

FOREIGN PATENT DOCUMENTS

| | | |
|---|---|---|
| DE | 3405478 A1 | 8/1985 |
| DE | 4422137 C1 | 2/1995 |
| EP | 0917934 A1 | 5/1999 |
| GB | 1598352 A | 9/1981 |
| JP | 59050120 | 3/1984 |
| JP | 60258416 | 12/1985 |
| JP | 9-510401 | 10/1997 |
| WO | WO 95/24983 | 9/1995 |
| WO | WO 02/05984 A2 | 1/2002 |

* cited by examiner

*Primary Examiner*—Roy King
*Assistant Examiner*—Jie Yang
(74) *Attorney, Agent, or Firm*—Sughrue Mion, PLLC

(57) ABSTRACT

The present invention provides a martensitic stainless steel strip for razor blades in annealed state comprising a continuous processed groove being formed with thermal energy in a longitudinal direction on one side of the strip at a position with a predetermined distance from one edge; and a continuous changed structure area being formed with thermal energy in a longitudinal direction on opposite side of the strip at a position having a predetermined distance from the edge, wherein the processed groove functions as a splitting portion of the strip.

In addition, the present invention provides a method for manufacturing the steel strip for razor blades.

4 Claims, 4 Drawing Sheets a b a b a

40μm b

STEEL STRIP FOR RAZOR BLADES AND METHOD OF MANUFACTURING THE SAME

TECHNICAL FIELD

The present invention relates to martensitic stainless steel strips for razor blades and method of manufacturing the same.

BACKGROUND OF INVENTION

The Conventional production of razor blades cuts a steel strip mechanically.

JP-A-9-510401 entitled "RAZOR BLADE MANUFACTURE", for example, discloses a manufacturing method of razor blades, in which a coil employed as a raw material is stamped, straight grooves (openings) are formed by slitting knives, then heat-treated for hardening, and finally split into end-products.

The method is excellent for improving productivity, because forming grooves, hardening, and splitting are sequentially processed on a coiled steel strip.

With regard to the steel strip employed as a raw material in the method disclosed in JP-A-9-510401, grooves are formed on an as-rolled steel strip by the slitting knives. In this case the slitting knives must be positioned with high precision. Moreover, there poses a problem that abrasion of the slitting knives increases as the feeding rate of the strip of raw material increases. Thus, it is impossible to increase the feeding rate of the strip of raw material.

SUMMARY OF INVENTION

The objective of the present invention is to produce a steel strip for razor blades by a new method, which doesn't require of forming grooves mechanically.

In order to create grooves mechanically, the steel strip is required to be in contact with a slitting knife and must be positioned with high precision. The inventors have investigated a method for forming a splitting portion on the strip by a non-contact method. As a result, the inventors have learned that by partially heating the strip with a laser beam machine utilizing thermal energy, it is possible to form the splitting portion with high precision. As a result of further investigation, the inventors have found that it is possible to form the splitting portion on the strip at a high speed, when the laser beam machine is used.

Additionally as a result of still further investigation, the inventors have learned that a problem of deformation of the steel strip such as camber(bending) is posed when a splitting portion is formed on the steel strip. The inventors however have found that if a changed structure area is formed by irradiating with thermal energy at another area, the problem of deformation of the strip is solved, ultimately attaining the objective of the present invention.

The present invention provides a martensitic stainless steel strip for razor blades in annealed state comprising: a continuous processed groove, formed by thermal energy in a longitudinal direction on one side of the strip at a position at a predetermined distance from one edge; and a continuous changed structure area formed by thermal energy in a longitudinal direction on the opposite side of the strip at also positioned at a predetermined distance from the opposite edge, wherein the processed groove functions as a splitting portion of the strip.

The processed grooves mentioned above is formed by laser beam and the laser-processed groove has a width of not more than 200 μm and a depth of no less than 5% of the thickness of the strip.

The martensitic stainless steel used for the present invention comprises (by mass percent) 0.30 to 0.80% C, up to 1.0% Si, up to 1.0% Mn, 10.0 to 15.0% Cr and the remaining being substantially Fe.

The martensitic stainless steel can contain up to 2.0% Mo by mass optionally, in addition to the aforementioned chemical composition.

The present invention provides a method for manufacturing a steel strip for razor blades through the following steps: irradiating areas predeterminedly distanced from each edge, while running the strip; forming a continuous processed groove functioning as a splitting portion in a longitudinal direction on one side of the strip; and forming a continuous changed structure area in a longitudinal direction on the other side of the strip.

The splitting portion of the strip for the present invention is constituted as the continuous processed groove formed with the thermal energy in the longitudinal direction of the strip. Thus, the splitting portion of the strip is formed to have a substantially constant form in cross section over the whole length of the strip. The present invention has advantages that it prevents a problem that when the strip is split, the strip partially remains connected without separating.

Additionally, because the continuous processed groove is formed by thermal energy (for example by laser beam) the splitting portion of the strip is processed without any contact and with high precision. By selecting a laser beam machine, the feeding rate of the strip can be increased as compared with conventional methods. Therefore, the present invention provides excellent productivity.

As described above, the greatest feature of the present invention is that a continuous processed groove is formed by thermal energy in a longitudinal direction at a splitting portion of a steel strip for razor blades on one edge side of the strip, and a continuous changed structure area is formed in the longitudinal direction on the opposite edge side of the strip.

Furthermore, the reason why both portions are irradiated with thermal energy at respective predetermined distances from each edge of the martensitic stainless steel strip in annealing condition is that, if only one processed groove is formed, thermal contraction due to heating, melting, cooling occurs, and deformation such as camber(bending) is generated. Thus, the processed groove and the changed structure area are formed at portions having respective predetermined distances from each edge of the martensitic stainless steel strip.

With this arrangement, the deformation of the martensitic stainless steel strip can be suppressed by irradiating the strip with thermal energy.

Hereinafter, the present invention will be explained in detail.

BRIEF DESCRIPTION OF DRAWINGS

FIG. 4a is a view before bending and FIG. 4b is a view after bending.

In the Figures, like numerals are used to denote like elements.

Figure 1:
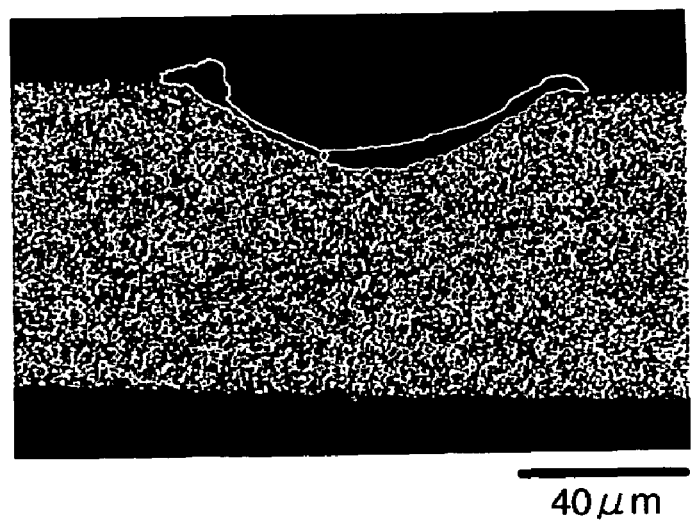
FIG. 1*a* is a sectional microphotograph of an example of a steel strip for razor blades in which a processed groove is formed and FIG. 1*b* is a schematic view of the sectional microphotograph.
Figure 1:
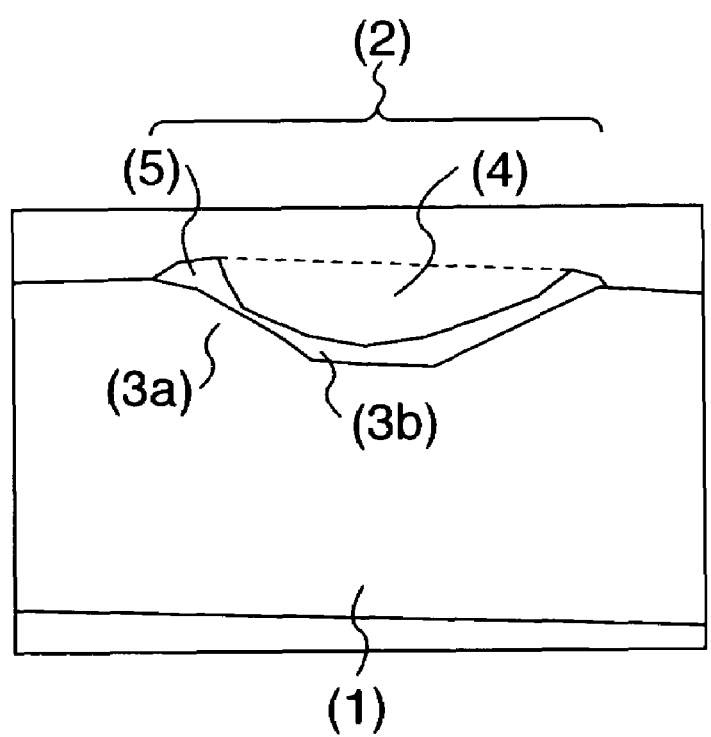

1 denotes a strip.
2 denotes a changed structure area.
3a denotes a heat affected zone.
3b denotes a molten-and-solidified zone.
4 denotes a processed groove.
5 denotes a protuberance area(s).
6 denotes an edge.
7 denotes a width.
8 denotes a depth.
9 denotes a bending angle.

DETAILED DESCRIPTION ON INVENTION

The martensitic stainless steel used as raw materials for razor blades of the present invention signifies a stainless steel whose metallographic structure is transformed into a martensitic structure by quenching, its hardness is increased, and which contains at least 10% Cr by mass. The martensitic stainless steel is worked into a strip, as a result the strip is used as the raw materials.

The raw material for razor blades after annealing has a ferritic structure, and because the raw materials has yet to be hardened by quenching, the hardness of the raw materials is low and in a state that makes it possible to be wound into a coil. Thus, in the present invention, the martensitic stainless steel strip in the annealing condition is used as raw materials for razor blades.

Vickers hardness of the martensitic stainless steel strip in the annealing condition is to be between HV250 to 370 with which the raw material for razor blades can be wound into the coil. In addition, the steel strip in the annealing condition referred to in the invention signifies the annealed strip which is in a state prior to quenching in order to increase its hardness. The annealing is normally carried out. Furthermore, it may also include annealed steel strips which are finish-cold-rolled with a reduction ratio of no more than 20%. Incidentally, even in case of a process of the finish-cold-rolling is included, it is preferable to have the hardness in which the finished-cold-rolled strips can be wound into the coil, and desired Vickers hardness in the annealing condition is between HV260 to 330.

In the present invention, a processed groove functioning as a splitting portion is formed by heating with a laser beam machine utilizing, for example, thermal energy, in a longitudinal direction at a position having a predetermined distance from one edge of the above-described steel strip. In addition, a changed structure area to prevent deformation is formed by heating with a laser beam machine on the opposite edge side of the processed groove.

Meanwhile, the processed groove represents a recessed portion formed when the martensitic stainless steel strip is processed by the thermal energy. The changed structure area represents a portion where a change in metallographic structure has taken place when the martensitic stainless steel strip is processed for example, by thermal energy. Furthermore, a preferable method of forming the processed groove and its dimensions will be described later.

In the present invention, the preferable forming method of the processed groove is with laser beam machine. This is because the laser beam machine forms the groove by heating and cooling a portion of the martensitic stainless steel strip and forms into a brittle molten-and-solidified structure without contact with the strip. The brittle molten-and-solidified structures are maintained almost as they are even if they are quenched and tempered. With this arrangement, the steel strip is split at the processed groove.

In addition, with a laser beam machine, the dimensions of the heat affected zone can be easily controlled with high precision. The steel strip can also be fed at a high feeding rate while the strip is irradiated, thus productivity can be remarkably improved.

As for the formation of the changed structure area on the opposite edge side of processed groove, a dimensional control of the portion can be easily conducted with high precision. Furthermore, while feeding the strip at high speed, the portion can be irradiated with a laser beam, thus productivity can be further improved.

In order to suppress further deformation due to heating-and-cooling, it is desirable to form the changed structure area at a position having a substantially equal distance from its edge as compared the distance between the groove and its corresponding edge. However, the position may be shifted according to the output of the laser beam. A groove can be formed by laser beam at the changed structure area. If the groove at the changed structure area has a depth exceeding that of the processed groove, the strip becomes fragile, and a breakage will occur at the changed structure area. To prevent this fragile of the strip, it is preferable that the depth of the groove formed at the changed structure area be less than the depth of the processed groove functioning as the slitting portion, and the depth of the groove at the changed structure area should be made as small as possible. Even if the formation of a groove at the changed structure area is unavoidable, by controlling the depth of the groove as deep as 50% of the depth of the processed groove functioning as the slitting portion, the fragileness of the strip can be suppressed.

A YAG laser machine may be used to form the processed groove or the changed structure area by laser beam. In particular, a semiconductor excitation DISK-YAG laser which is capable of generating a stabilized high output for a long time, may be used.

To form the groove (heat affected zone) in the splitting portion with the laser beam machine, the steel strip of the raw materials can be fed at a rate of not less than 500 m/min, which is different from the case of a mechanical groove machine. According to the inventors, it is possible to feed the strip at a rate of more than 1000 m/min.

The processed groove and the changed structure area formed with a laser beam machine have substantially constant cross sectional forms and continuous in the longitudinal direction of the strip. Thus, it is possible to prevent the problem where the steel strip partially remains connected without being split when the steel strip is split.

Figure 5:
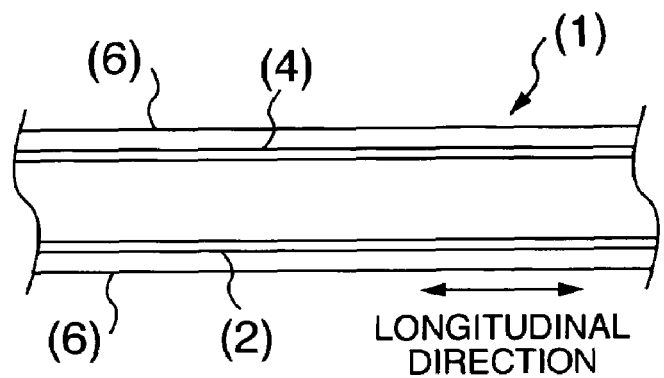
FIG. 5 is a schematic view showing an example of a strip for razor blades in which a processed groove and a changed structure area are formed.

Meanwhile, a processed groove 4 and a changed structure area 2 are formed continuously at portions having predetermined distances from each edge 6 of a strip 1 for razor blades as shown in a schematic view of a surface (rolled surface) of the strip shown in FIG. 5. Here, the longitudinal direction signifies the length direction of a rolled strip.

If the processed groove and the heat affected zone are formed discontinuously, there is a problem where the strip partially remains connected without being split. Therefore, the processed groove and the heat affected zone must be formed continuously.

In the present invention, when the processed groove is formed in the strip, the strip can be split when bent at an acute angle. The split of the strip by bending will be described in detail in examples later.

When the groove and changed structure area are formed with a laser beam, as shown in sectional microphotograph in FIG. 1, there is a characteristic that a molten-and-solidified zone 3b and a heat-affected zone 3a are formed in the periphery of the processed groove 4 formed in the changed structure area.

The molten-and-solidified zone and the heat-affected zone observed in the sectional metallographic structure are also observed in the changed structure area referred to in the present invention.

In the present invention, it is preferable that the width is no more than 200 μm and the depth is not less than 5% of the strip's thickness.

The reason why the width of the groove is selected to be no more than 200 μm because the width is widened excessively, the splitting position becomes unstable, and a wide width gives an adverse effect to precision. A width in a range of 10 to 100 μm is more preferable even more.

The depth is selected to be no less than 5% of the strip's thickness because when the strip is split by bending after stabilizing the strip, more stress can be concentrated on the grooves, allowing the strip to be split at an even more acute angle. Although the depth of the groove can be deepened, by selecting a different type of laser beam machine or a variation of processing condition, if the depth of the groove is excessively deepened, the groove can melt away and the fragileness of the coil. In particular, because the thickness of the strip for razor blades is thin, less than 3 mm (there are 100 μm thickness as well), a preferable upper limit of the depth is 50% of the strip thickness.

A preferable range of the depth of the processed groove is between 10 to 47% of the strip thickness.

Next the preferable chemical composition of the martensitic stainless steel used in the present invention will be explained. The composition will be described by mass percent unless otherwise indicated.

Carbon (C): 0.30 to 0.80%

C contained in a carbide is dissolved into a matrix at an austenite formation temperature when heat treated for quenching. C is an important element to determine a hardness of a martensitic structure formed by quenching. In order to obtain a sufficient hardness for razor blades, C content in the martensitic stainless steel is preferably no less than 0.30%. However, when C content exceeds 0.80%, a large sized eutectic carbide is liable to be crystallized in solidification. When used for applications requiring a thin thickness and a sharp cutting edge, the large sized carbide is likely to cause a chip off of the blade edge. Thus, an upper limit of C content is decided to be 0.80%.

Silicon (Si): up to 1.0%

Si, which is normally used as a deoxidizer when molten steel is refined, is dissolved into a steel matrix and is known as an element for suppressing softening in low tempering temperatures. However, Si is likely to remain in the steel as a hard nonmetallic inclusion ($SiO_2$) and may cause the blade edge to chip off, and even a spotted rust. Thus, an upper limit of Si content is determined to be 1.0%. A preferable range of Si is up to 0.35%.

Manganese (Mn): up to 1.0%

Mn has a role as a deoxidizer when a molten steel is refined, similar to silicon. Mn forms a soft nonmetallic inclusion such as MnS or Mn—Si-Oxide which is extensible by plastic working, and is effective for preventing formation of the aforementioned hard nonmetallic inclusion ($SiO_2$). However, when Mn content exceeds 1.0%, hot workability of the steel is lowered. Thus, an upper limit of Mn content is determined to be 1.0%. A preferable range of Mn is 0.6 to 0.8%.

Chromium (Cr): 10.0 to 15.0 percent

Cr is an indispensable element for the stainless steel as it resist corrosion. In order to achieve sufficient corrosion resistance and to disperse fine chromium carbides by way of bonding Cr to C, Cr content is preferably not less than 10%. However, Cr content exceeding 15% brings about precipitation of $Cr_7C_3$ type large sized carbides and is likely to cause the blade edge to chip off. Thus, a range of Cr is determined to be 10.0 to 15.0%. The range of Cr is more preferably 12.0 to 14.5%.

In the present invention, other than the aforementioned elements, a range of up to 2.0% molybdenum (Mo) may be contained.

Mo: up to 2.0%

Mo may be added into the steel optionally, because it improves corrosion resistance against halogen family elements such as chlorine which induces pitting corrosion. However, Mo content exceeding 2.0% lowers an initiating temperature of martensitic transformation (Ms point), so that retained austenite is increased in surplus in quenching, and quenching hardness is lowered. Thus, a range of Mo is determined to be up to 2.0%. A desirable range of Mo is 0.5 to 1.5%.

In the present invention, other than the aforementioned elements, the balance is substantially Fe. However, nickel may be contained for improving a corrosion resistance against non-oxidizing acid such as sulfuric acid ($H_2SO_4$) and impurities may be contained.

However, when a total amount of elements other than the aforementioned elements exceeds 2.0%, it is likely to cause the blade edge to chip off, or deteriorates hot workability etc. of the steel, therefore the total amount of the elements which may be contained other than the aforementioned elements and the balance of Fe is limited to 2.0%.

EXAMPLES

Hereinafter, the present invention will be explained through the result of experiments.

Ingots (No. 1 and No. 2 alloys) of martensitic stainless steels manufactured by melting in ambient atmosphere were forged and hot rolled, and oxidized scales formed in the hot working were removed, to thereby obtain raw materials for cold rolling.

The raw materials were cold rolled and annealed repeatedly. After the finally annealing, they were finish rolled at a reduction rate of 18%, thereby obtaining raw material having a thickness of 0.08 mm and a width of 6 mm for steel strips for the razor blades. Chemical compositions of alloys are shown in Table 1.

Metallographic structures of both alloys of the steel strips for razor blades have ferritic structures. Hardness, in Vickers hardness, of the alloy No. 1 was HV280 and that of the alloy No. 2 was HV290, and in a state where the strips could be wound into coils.

TABLE 1

| Alloy No. | C | Si | Mn | Cr | Mo | Balance |
| --- | --- | --- | --- | --- | --- | --- |
| 1 | 0.48 | 0.46 | 0.90 | 13.7 | 1.25 | Fe and Inevitable Impurities |

TABLE 1-continued

| Alloy No. | C | Si | Mn | Cr | Mo | Balance |
|---|---|---|---|---|---|---|
| 2 | 0.65 | 0.27 | 0.73 | 13.6 | — | Fe and Inevitable Impurities |

Note 1:
— Mark signifies Not Contained
Note 2:
Inevitable Impurities included are less than 0.05%

By using the raw material of the steel strip for razor blades, while the strip was run through a machine a processed, groove 4 was formed at an area of 1 mm distant from one edge 6 of the strip where the strip should be split in a longitudinal direction, with a laser beam machine. At this time, a changed structure area 2 serving to prevent deformation was formed at an area 1 mm distant from the opposite edge 6 of the strip in a longitudinal direction with the use of a laser beam machine, while the strip was running through a machine. Thus, the steel strip 1 for razor blades shown in a schematic view in FIG. 5 was produced.

In order to process the strip at a high speed, there is a method of moving the nozzle of the laser beam. However, because the mobility of the nozzle of the laser beam is limited, the strip was moved instead. Thus, in the present examples, the laser-processed groove and the changed structure area were formed, while running the strip through a machine, at a constant speed.

Furthermore, for processing strips with long length, a method was adopted in which the strip wound in a coil was uncoiled at one end, and rewound into a coil at the other end. To avoid a change in speed as the wound amount of increases, a speed regulator was employed as a solution.

An experiment was carried out with the use of a YAG laser machine as a laser generator. While there are two types of laser output, a continuous output type and a pulse output type, the continuous output type proved to be best for speedy processing of groove.

Tables 2 and 3 list the types of alloys used, laser beam processing condition, and feeding rates of the steel strips. Table 2 shows conditions for processing the grooves, while Table 3 shows conditions for forming the changed structure area.

TABLE 2

Processing conditions of a processed groove: continuous Output Type

| No. | Alloy No. | Type | Output (W) | Wave Length (μm) | Processing Speed (m/min) | Assist Gas Pressure (MPa) | Focus Diameter |
|---|---|---|---|---|---|---|---|
| A1–A5 | 2 | DISK-YAG | 550 | 1.06 | 300 | 1.0 | 75 |
| A6 | 1 | DISK-YAG | 900 | 1.06 | 500 | 1.0 | 75 |
| A7 | 2 | DISK-YAG | 700 | 1.06 | 500 | 1.0 | 75 |
| A8 | 1 | DISK-YAG | 500 | 1.06 | 500 | 1.0 | 75 |
| A9 | 1 | DISK-YAG | 550 | 1.06 | 300 | 1.0 | 75 |
| A10 | 1 | DISK-YAG | 900 | 1.06 | 500 | 1.0 | 75 |

TABLE 3

Processing condition of a changed structure area: Continuous Output Type

| No. | Alloy No. | Type | Output (W) | Wave Length (μm) | Processing Speed (m/min) | Assist Gas Pressure (MPa) | Focus Diameter |
|---|---|---|---|---|---|---|---|
| A1 | 2 | ROD-YAG | 250 | 1.06 | 300 | 1.0 | 150 |
| A2 | 2 | ROD-YAG | 400 | 1.06 | 300 | 1.0 | 150 |
| A3 | 2 | ROD-YAG | 550 | 1.06 | 300 | 1.0 | 150 |
| A4 | 2 | DISK-YAG | 250 | 1.06 | 300 | 1.0 | 75 |
| A5 | 2 | DISK-YAG | 350 | 1.06 | 300 | 1.0 | 75 |
| A6 | 1 | DISK-YAG | 100 | 1.06 | 500 | 1.0 | 75 |
| A7 | 2 | DISK-YAG | 300 | 1.06 | 500 | 1.0 | 75 |
| A8 | 1 | DISK-YAG | 500 | 1.06 | 500 | 1.0 | 75 |
| A9 | 1 | | changed structure area is not formed | | | | |
| A10 | 1 | | changed structure area is not formed | | | | |

From the aforementioned laser beam processed steel strips A1 to A10, samples were taken at three locations: one from each end and other from the center.

From the samples, test pieces were taken for observing sectional microphotograph and for measuring deformation. The test pieces for measuring deformation were made into dimensions of 0.08 mm×6 mm×1000 mm. A bend of the test piece was measured by aligning both ends of the test piece to a measuring scale having a straightness of no more than 0.1 mm. The gap between the test piece and the scale was measured at 500 mm in length.

Each of the sectional microphotographs of the processed groove and the changed structure area dimension were observed and were measured.

Figure 2:
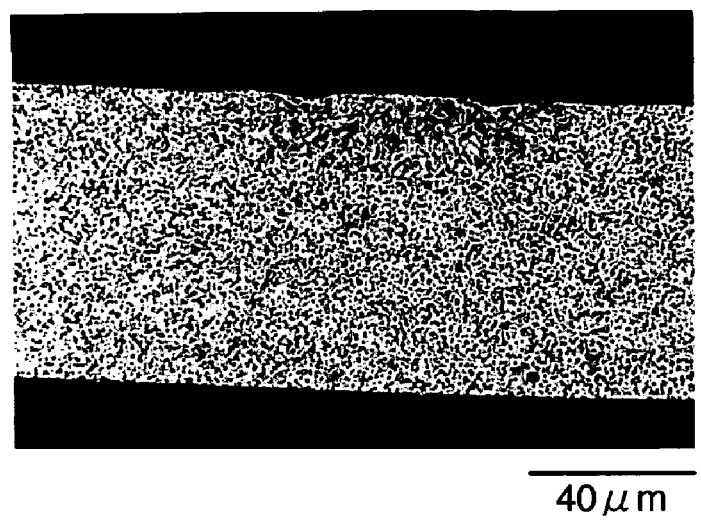
FIG. 2*a* is a sectional microphotograph of an example of a steel strip for razor blades in which a changed structure area is formed.
FIG. 2*b* is a schematic view of the sectional microphotograph.
Figure 2:
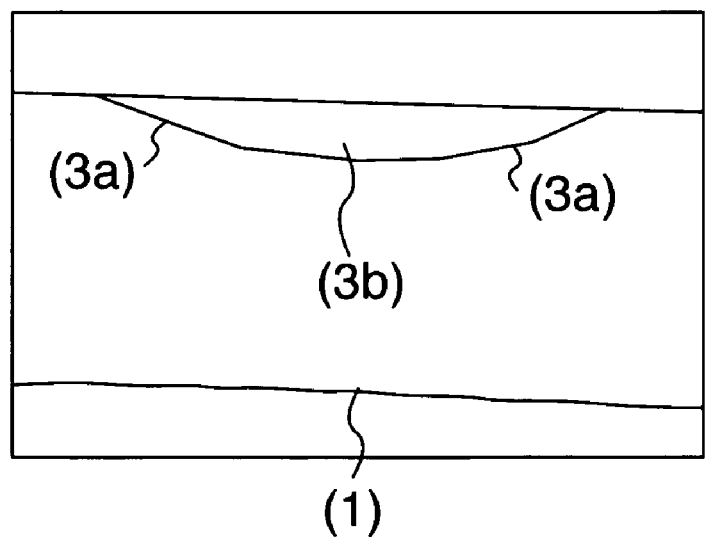

As an example, sectional microphotographs of the processed groove and the heat affected zone of test piece A1 are shown in FIGS. 1a and 2a.

FIG. 1a is a microphotograph showing a sectional metallographic structure of the processed groove of test piece A1, which depicts that a heat affected zone 2 is formed in the strip 1 by laser beam. In the heat affected zone 2, the processed groove 4 functioning as the splitting portion is formed, and in the periphery of the processed groove, a molten-and-solidified zone 3b and a heat-affected zone 3a are formed.

As shown by a dotted line in the schematic view of FIG. 1b, there is a case where there are protuberances formed above the dotted line. In this case, the protuberance may be flattened again by cold rolling with a small reduction ratio.

Figure 3:
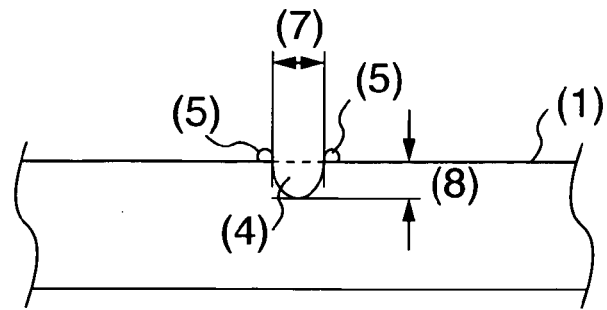
FIG. 3 is a sectional schematic view showing the width and the depth of a processed groove formed in a steel strip for razor blades.

The width 7 of the processed groove does not indicate the distance between the protuberance areas 5. When drawing straight line between both flat portions outside of the groove, the distance between both sides within the groove (intersecting the hypothetical line) refers to the actual width of the groove in the present invention (see a dotted line portion in FIG. 3). The depth 8 is the distance from the deepest position of the groove to the flat surface outside the groove (see FIG. 3).

Additionally, in observing the cross section of the changed structure area serving to prevent deformation of test piece A1 shown in FIG. 2b, a structure including the molten-and-solidified zone and the heat-affected zone is formed.

From the steel strip for razor blades in which the processed groove functioning as the splitting portion and the changed structure area serving to prevent deformation are formed by laser beam machining, test pieces were taken from three locations near each end and also from the vicinity of the central area in the longitudinal direction. As a result of observation of sectional microscopic structures of test pieces, it was confirmed that all the test pieces have substantially the same cross sectional forms.

In Table 4, widths and depths of the processed grooves of the test pieces taken from the center positions of the strips are shown. While Table 5 shows widths and depths of the grooves formed when the changed structure area serving to prevent deformation are processed, in cases where a groove is not formed in the heat affected zone, it is noted, "no groove is formed". Steel strips A9 and A10 were omitted from the Table 5 because changed structure area were not formed.

TABLE 4

| No. | Width (μm) | Depth (μm) | Depth/ Thickness (%) | Amount of Deformation (mm) |
|-----|------------|------------|----------------------|----------------------------|
| A1  | 85         | 25         | 31                   | 4                          |
| A2  | 85         | 25         | 31                   | 3                          |
| A3  | 85         | 25         | 31                   | 3                          |
| A4  | 85         | 25         | 31                   | 2                          |
| A5  | 85         | 25         | 31                   | 1                          |
| A6  | 95         | 37         | 46                   | 4                          |
| A7  | 79         | 37         | 46                   | 2                          |
| A8  | 79         | 8          | 10                   | 0                          |
| A9  | 85         | 25         | 31                   | 9                          |
| A10 | 95         | 37         | 46                   | 10                         |

TABLE 5

| No. | Width (μm) | Depth (μm) | Depth/Thickness (%) |
|-----|------------|------------|---------------------|
| A1  | No Groove is formed | | |
| A2  | No Groove is formed | | |
| A3  | No Groove is formed | | |
| A4  | No Groove is formed | | |
| A5  | No Groove is formed | | |
| A6  | 50         | 3          | 4                   |
| A7  | 50         | 5          | 6                   |
| A8  | 79         | 8          | 10                  |

Figure 4:
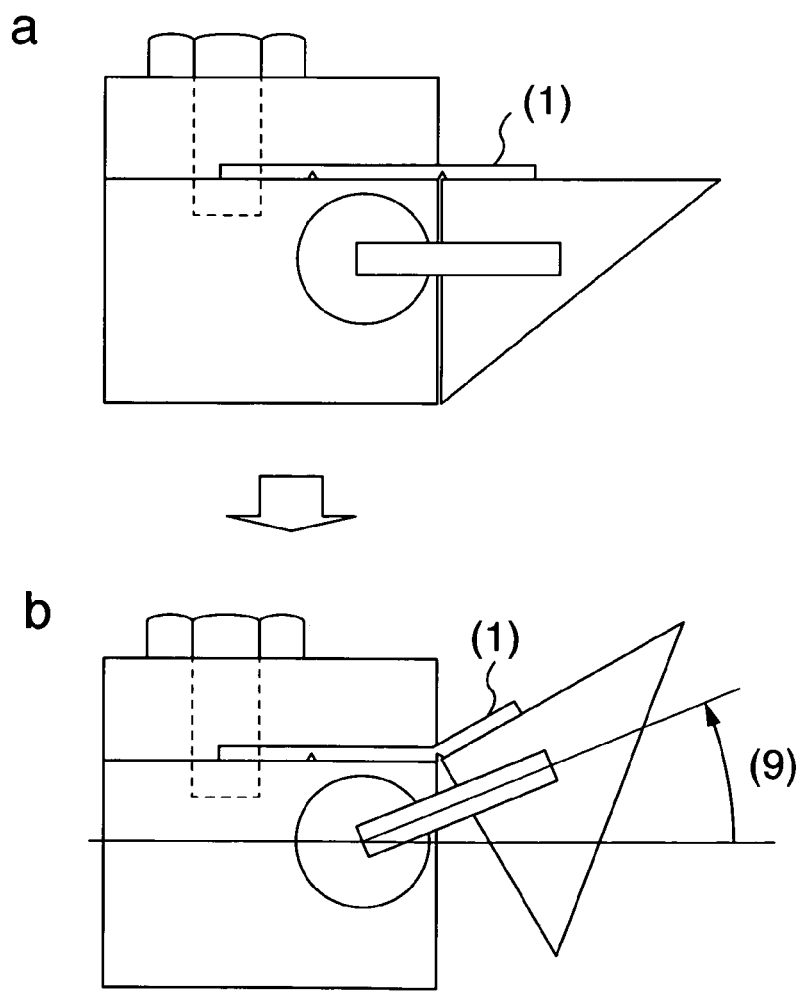
FIGS. 4a and 4b show a splitting (bending) test of a steel strip for razor blades.

In order to execute a splitting test of the steel strip for razor blades, two test pieces having a thickness of 0.08 mm, a width of 6 mm and a length of 15 mm were taken. One end of the test piece was stabilized, while the other end was bent using a testing device as shown in FIG. 4a and FIG. 4b by a schematic view. The test piece in which the processed groove was formed was bent with the groove being outside so that stress was concentrated to towards the bottom of the groove. FIG. 4a is a schematic view before bending and FIG. 4b is a schematic view after bending where 9 indicates the bending angle (direction of bending) of strip 1.

Test pieces for the splitting test were taken from the steel strip for razor blades which was hardened by quenching from a temperature of 1050-1100° C. and tempering at a temperature of 350° C. Hardness of the test piece after having quenched and tempered was 620 to 660 in Vickers hardness.

Figure 6:
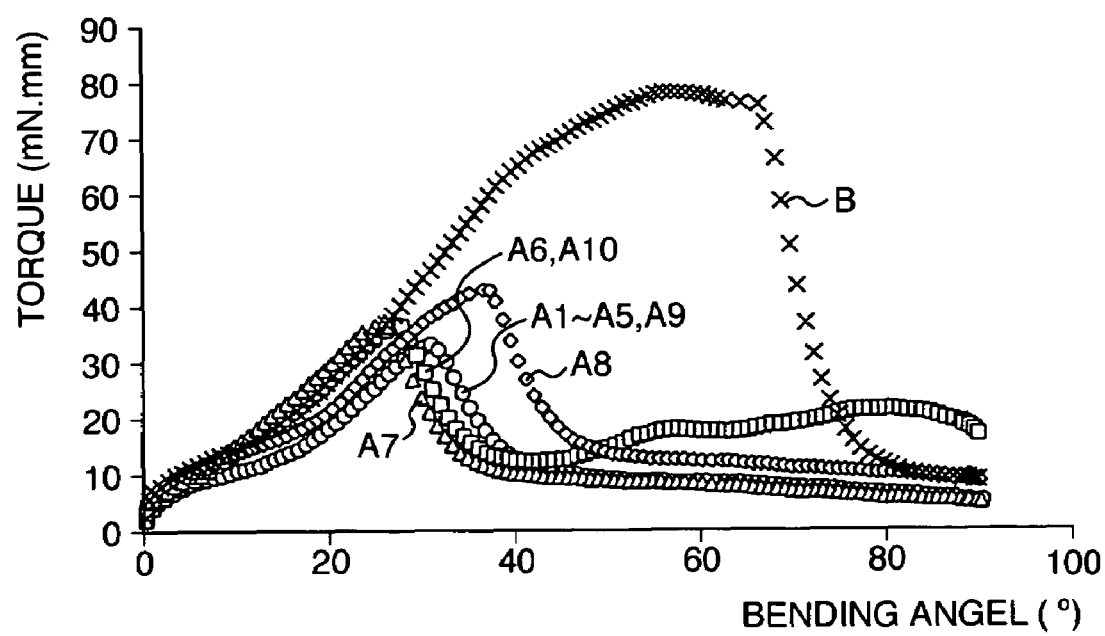
FIG. 6 is a view showing a splitting (bending) test result of a steel strip for razor blades.

A result of the splitting test is shown in FIG. 6, where a bending angle 9 is taken as the abscissa axis while a torque required for achieving the bending angle is taken as the ordinate axis. The results are shown in Table 6, where the test piece which could be split at the groove formed by laser beam is expressed as "Y" mark and the test piece which could not be split therein is expressed as "X" mark.

In the split test, the test piece in which no groove was formed was tested as a comparative example (which had an alloy composition was alloy No. 2) which is indicated as "no groove (heat affected zone (B))". The size of the test piece was 0.08 mm in thickness, 6 mm in width and 15 mm in length.

TABLE 6

| No. | Precision of Splitting Position |
|-----|---------------------------------|
| A1  | Y |
| A2  | Y |
| A3  | Y |
| A4  | Y |
| A5  | Y |
| A6  | Y |
| A7  | Y |
| A8  | Y |
| A9  | Y |
| A10 | Y |
| No Processed groove is formed (B) | X |

From the result of the experiments, all the test pieces of the present invention can be split at a smaller angle and with less torque than those in which no processed groove and no heat affected zone are formed, while deformation was suppressed. As a result, it was found that an excellent bending property can be obtained.

Regarding strip No. A8, deformation could be suppressed, and the strip showed no deformation. As the depth of the groove of this strip formed in the heat affected zone was relatively deep, when the steel strip was stabilized on the test device in a bending test shown in FIG. 4, there was a case where cracks were formed at a portion of the changed structure area. Thus, attention should be given in the treatment of this steel strip.

From the above result, it was confirmed that there was no deformation or small deformation in those strips which have two thermally processed portions: The processed groove functioning as the splitting portion, the changed structure area serving to prevent deformation.

The present invention is excellent in processing speed and splitting characteristics. Thus, it can be applied to applications which are indispensable for splitting a steel strip with high precision. In addition, in the case of steel strips with a changed structure area, bending of the material can be remarkably reduced, therefore when the steel strip is wound into a coil form, the risk of collapse in winding decreases. Thus this present invention can be applied towards a products requiring high precision.

The invention claimed is:

1. A method for manufacturing a steel strip for razor blades comprising the steps of:

Irradiating thermal energy along a first line in a longitudinal direction of the strip having a first distance from a first edge of a martensitic stainless steel strip in annealed state, while running the strip, to form a continuous processed groove along the first line serving as a splitting portion, the splitting portion having a width of not more than 200 μm and depth of not less than 5% of the thickness of the strip; and irradiating thermal energy along a second line in the longitudinal direction having a second predetermined distance from a second edge of the strip, while running the strip, to form a continuous area of heat changed structure along the second line in order to suppress deformation of the strip, wherein the second edge of the strip is on the opposite side of the first edge of the strip, wherein the first distance is substantially identical to the second distance, and wherein the steel comprises, by mass percent, 0.3 to 0.8% C, up to 1.0% Si, up to 1.0% Mn, 10.0 to 15.0% Cr, optionally up to 2.0% Mo, the balance being substantially Fe.

2. The method according to claim 1, wherein the continuous area of heat changed structure has a thickness less than a thickness of the strip.

3. The method according to claim 1, wherein the method further comprises quenching and tempering the strip.

4. The method according to claim 1, wherein the continuous area of heat changed structure has a thickness less than a thickness of the strip and wherein the method further comprises quenching tempering the strip.

* * * * *